United States Patent [19]
Susak

[11] Patent Number: 5,172,409
[45] Date of Patent: Dec. 15, 1992

[54] PRECISION FET CONTROL LOOP
[75] Inventor: David M. Susak, Chandler, Ariz.
[73] Assignee: Motorola, Inc., Schaumburg, Ill.
[21] Appl. No.: 547,738
[22] Filed: Jul. 2, 1990
[51] Int. Cl.[5] .............................................. H04B 1/58
[52] U.S. Cl. .................................... 379/377; 379/385; 379/344; 379/394; 307/544
[58] Field of Search ............... 379/377, 385, 344, 166, 379/324, 322, 413, 394, 398, 412, 414, 400; 307/544

[56] References Cited

U.S. PATENT DOCUMENTS

| | | | |
|---|---|---|---|
| 4,178,485 | 12/1979 | Cowpland et al. | 379/398 X |
| 4,182,936 | 1/1980 | Beirne et al. | 379/398 |
| 4,306,122 | 12/1981 | Nijman et al. | 379/377 |
| 4,314,106 | 2/1982 | Bakker | 379/377 |
| 4,424,498 | 1/1984 | Murray et al. | 379/398 X |
| 4,604,535 | 8/1986 | Sasayama et al. | 307/544 |
| 4,742,540 | 5/1988 | Schingh | 379/398 X |
| 4,766,608 | 8/1988 | Tin | 379/377 X |
| 4,935,959 | 6/1990 | Markovic et al. | 379/377 |
| 4,942,603 | 7/1990 | Chambers | 379/344 X |

FOREIGN PATENT DOCUMENTS

| | | | |
|---|---|---|---|
| 2627920 | 9/1989 | France | 379/413 |
| 1092704 | 5/1984 | U.S.S.R. | 379/344 |
| 2061669 | 5/1981 | United Kingdom | 379/385 |

Primary Examiner—James L. Dwyer
Assistant Examiner—M. Shehata
Attorney, Agent, or Firm—Bradley J. Botsch, Sr.

[57] ABSTRACT

A telephone line card circuit includes an operational amplifier circuit having first and second inputs and an output. A field-effect transistor circuit has first, second and control electrodes, the control electrode is coupled to the output of the operational amplifier circuit, the first electrode is coupled to the TIP/RING terminal, and the second electrode is coupled to the second input of the operational amplifier circuit. A first resistor is coupled between the TIP/RING terminal and the first input of the operational amplifier circuit. A second resistor is coupled between the first input of the operational amplifier circuit and a terminal of the circuit whereby the terminal of the circuit is typically coupled to a supply voltage terminal. A third resistor is coupled between the second input of the operational amplifier circuit and the terminal of the circuit such that the precision of the ratio of the resistance of the field-effect transistor circuit to the third resistor is determined by the precision of the ratio of the first resistor to the second resistor.

14 Claims, 3 Drawing Sheets

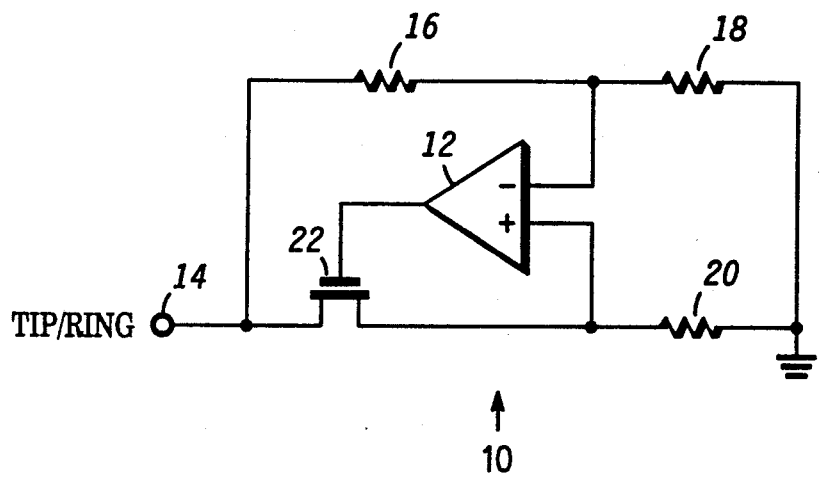
*FIG. 1*
*FIG. 2*
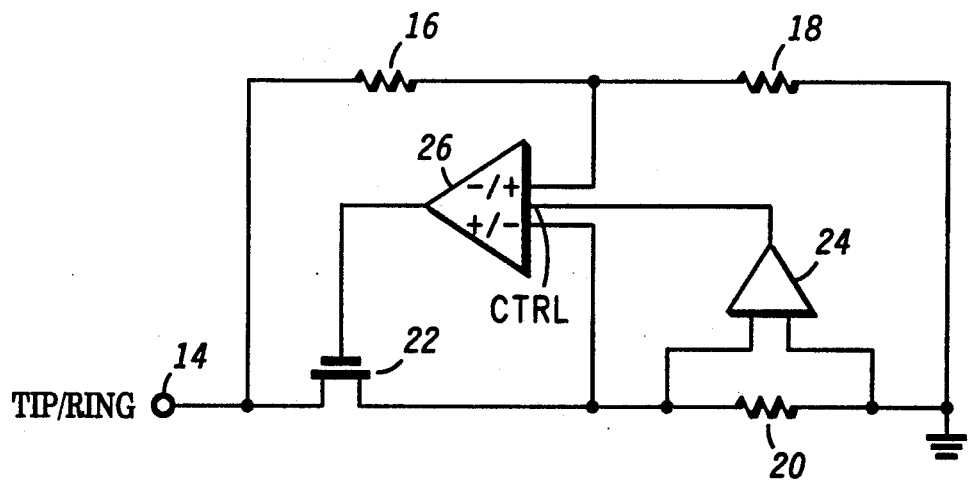

PRECISION FET CONTROL LOOP

CROSS REFERENCE TO A RELATED APPLICATION

The subject matter of the present invention is related to the subject matter of a patent application entitled "TRANSIENT PROTECTOR USING COMMON DRAIN FIELD EFFECT TRANSISTORS", by Welty et al, with application Ser. No. 07/547,882 and having a common assignee and filling date as the subject application.

BACKGROUND OF THE INVENTION

This invention relates to telephone line cards and, in particular, to a control loop circuit utilizing field-effect transistors which allows the precision of the resistance of the field-effect transistor to be determined by external resistors.

Telephone line cads are typically coupled between an external phone line and the control switches in a central office. The telephone line card typically provides two terminals, the TIP and RING terminals, to an external phone, whereby a first signal is applied to the TIP terminal, while a second signal is applied to the RING terminal. Further, a first resistor and a first mechanical relay are typically coupled between the TIP terminal and the central office, while a second resistor and a second mechanical relay are typically coupled between the RING terminal and the central office. The mechanical relays are typically closed under normal operation and normal voice signals typically appear as differential signals across the TIP and RING terminals. It should be pointed out that the first and second resistors must be closely matched, typically on the order of 0.1% of each other, so that when a common mode signal is induced onto the TIP and RING terminals, there is substantially no differential voltage between the TIP and RING terminals which would interfere with normal voice signals. In other words, the matching of the first and second resistors should provide substantial common mode rejection.

The problem of having the first and second resistors closely matched is further complicated when protection against lighting surges is desired. For example, when lightning strikes, the voltage on the TIP or RING terminals can quickly rise to an excess of 1,000 volts. Typically, the first and second mechanical relays are too slow to respond to this lightning surge and, therefore, the first and second resistors must dissipate the large power generated from the lightning surge. This means that the first and second resistors must be high power resistors as well as closely matched to each other. Furthermore, high power resistors are expensive and difficult to fabricate on an integrated circuit.

One solution to this problem of closely matching high power resistors is to replace the first and second mechanical relays with first and second field-effect transistors so that when lightning strikes, the FETs will turn off and the first and second resistors will not have to absorb the large power generated by the lightning surge. However, this approach requires the use of precision FETs that closely match each other in order to maintain substantially zero differential voltage between the TIP and RING terminals as aforedescribed.

Hence, a need exists for a circuit that controls the resistance of a field-effect transistor.

SUMMARY OF THE INVENTION

Accordingly, it is an object of the present invention to provide an improved telephone line card circuit.

Another object of the present invention is to provide a control loop circuit that controls the resistance of field-effect transistors.

Yet another object of the present invention is to provide a bi-directional control loop circuit that controls the resistance of field-effect transistors.

In carrying out the above and other objects of the present invention, there is provided a circuit for providing bi-directional current flow between first and second terminals comprising an operational amplifier having first and second inputs and an output; a field-effect transistor circuit having first, second and control electrodes, the control electrode being coupled to the output of the operational amplifier, the first electrode being coupled to the first terminal, and the second electrode being coupled to the second input of the operational amplifier; a first resistor coupled between the first terminal and the first input of the operational; a second resistor coupled between the first input of the operational amplifier and the second terminal; and a third resistor coupled between the second input of the operational amplifier and the second terminal, wherein the precision of the ratio of the resistance of the field-effect transistor circuit to the third resistor is substantially equal to the precision of the ratio of the first resistor to the second resistor.

The above and other objects, features, and advantages of the present invention will be better understood from the following detailed description taken in conjunction with the accompanying drawings.

BRIEF DESCRIPTION OF THE DRAWINGS

FIG. 1 is a detailed schematic diagram illustrating the control loop circuit of the present invention;

FIG. 2 is a detailed schematic diagram illustrating an enhancement of the control loop circuit of the present invention;

DETAILED DESCRIPTION OF THE INVENTION

Figure 3:
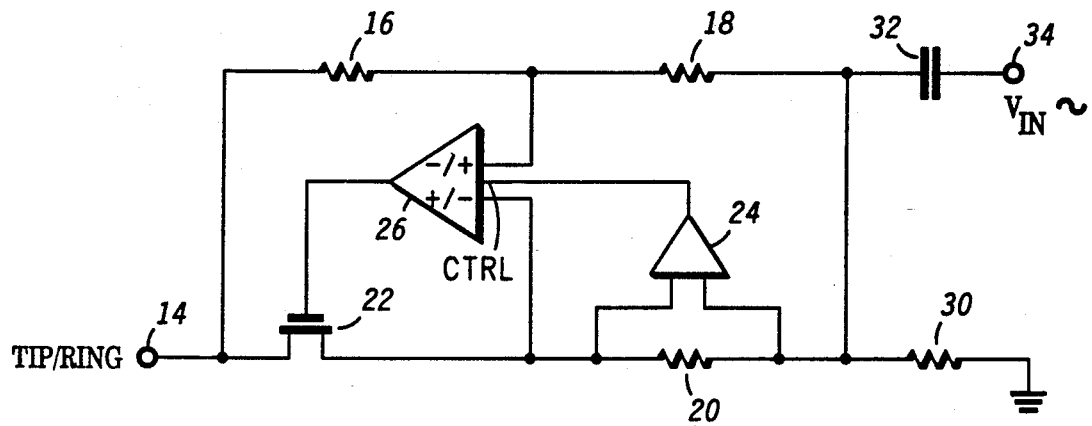
FIG. 3 is a detailed schematic diagram illustrating another enhancement of the control loop circuit of the present invention.

Referring the FIG. 1, a detailed schematic diagram illustrating control loop circuit 10 of the present invention for closely matching field-effect transistors (FETs) is shown comprising operational amplifier (op amp) 12 having a first input, for example an inverting input, coupled to terminal 14 by resistor 16 and coupled to a first terminal of control loop circuit 10 by resistor 18 whereby the first terminal of control loop circuit 10 may be coupled to a first supply voltage terminal. The second input of op amp 12, for example the non-inverting input, is coupled to the first terminal of control loop circuit 10 by resistor 20 and to a source of electrode of FET 22. The output of op amp 12 is coupled to a control electrode (gate) of FET 22, while the latter has a drain electrode coupled to terminal 14.

In operation, the sum of the resistances of resistor 20 and the drain-source resistance of FET 22 is substantially equal to a predetermined resistance, for example 200 ohms. Further, the sum of the resistances of resistors 16 and 18 is much greater than the value of resistor 20 so that resistors 16 and 18 do not influence the sum of the resistances generated by FET 22 plus the value of resistor 20. Op amp 12 operates to maintain the voltages at its first and second inputs substantially equal as is well known. Therefore, the voltages at the first and second inputs of op amp 12 can be calculated as:

$$V_{(first\ input)} = V_{(terminal\ 14)} \times [R_{18}/(R_{16}+R_{18})] \quad (1)$$

$$V_{(second\ input)} = V_{(terminal\ 14)} \times [R_{20}/(R_{20}+R_{(DS\ of\ FET\ 22)})] \quad (2)$$

where $V_{(first\ input)}$ is the voltage at the first input of op amp 12;

where $V_{(second\ input)}$ is the voltage at the second input of op amp 12;

$V_{(terminal\ 14)}$ is the voltage at terminal 14;

$R_{(DS\ of\ FET\ 22)}$ is the drain-source resistance of FET 22; and $R_{16}$, $R_{18}$ and $R_{20}$ are the respective resistances of resistors 16, 18 and 20.

Since FET 22 is in the negative feedback loop of op amp 12, its gate electrode will be driven by the output of op amp 12 until the voltage at the second input of op amp 12 is substantially equal to the voltage at the first input of op amp 12. When this occurs, $V_{(first\ input)} = V_{(second\ input)}$ and it follows from Eqns. 1 and 2 that the following relationship will result:

$$R_{16}/R_{18} = R_{(DS\ of\ FET\ 22)}/R_{20} \quad (3)$$

From Eqn. 3, one can clearly see that the precision of the ratio of the drain-source resistance of FET 22 to resistor 20 is determined by the precision of the ratio of resistor 16 to resistor 18. Further, resistors 16 and 18 are typically higher value, lower current resistors which allow them to be readily fabricated on an integrated circuit which allows for even additional precision of their ratios.

It should be realized that the circuit of FIG. 1 is only uni-directional since op amp 12 has its inverting input coupled to the first input of op amp 12, while its non-inverting input is coupled to the second input of op amp 12. Therefore, when the voltage at terminal 14 is decreasing, which means current is being sourced from terminal 14 through FET 22 to ground 14, the voltage at the first input of op amp 12 decreases, and the voltage at the output of op amp 12 increases. This will result in increasing the gate-source voltage of FET 22 which will decrease the drain-source resistance of FET 22, thereby decreasing the voltage at the second input of op amp 12, as expected. Thus, as the voltage at the first input of op amp 12 decreases, the voltage at the second input of op amp 12 also decreases and control loop circuit 10 is allowed to regulate the voltage at the control electrode of FET 22 thereby varying the drain-source resistance of FET 22.

However, when the voltage at terminal 14 is increasing, which means current is being sunk into terminal 14 from ground via FET 22, the voltage at the first input of op amp 12 is increasing and the voltage at the output of op amp 12 is decreasing. This will result in decreasing the gate-source voltage of FET 22 which will increase the drain-source resistance of FET 22, thereby decreasing the voltage at the second input of op amp 12. Thus, an unfavorable result occurs: as the voltage at the first input of op amp 12 increases, the voltage at the second input of op amp 12 decreases, thereby allowing op amp 12 to enter into a latch condition and preventing control loop circuit 10 from regulating the voltage at the control electrode of FET 22. However, for telephone line card circuit applications, requirements exist that desire the circuit to conduct AC and DC current in both directions.

Referring to FIG. 2, a detailed schematic diagram illustrating an enhancement to control loop circuit 10 of FIG. 1 is shown. It is understood that the components similar to those of FIG. 1 are designated by the same reference numerals. The circuit in FIG. 2 provides an enhancement to control loop circuit 10 which allows for bi-directional operation. The circuit of FIG. 2 further comprises comparator circuit 24 having its first and second inputs coupled across resistor 20 and its output coupled to a control input of bi-phase operational amplifier (bi-phase op amp) circuit 26. The first input of bi-phase op amp 26 is coupled to terminal 14 by resistor 16 and to the first terminal of control loop circuit 10 by resistor 18, while the second input of bi-phase operational amplifier 26 is coupled to the first terminal of control loop circuit 10 by resistor 20 and to the source electrode of FET 22. The output of bi-phase op amp 26 is coupled to the control electrode of FET 22.

In operation, comparator circuit 24 monitors the direction of current through resistor 20 and controls the phase of bi-phase op amp 26 by switching the non-inverting and inverting inputs at the first and second inputs thereof. As aforedescribed for control loop circuit 10 in FIG. 1, if the voltage at terminal 14 is increasing, current is being sunk into terminal 14 and as the voltage at the first input (inverting input) of op amp 12 increases, the voltage at the second input (non-inverting input) of op amp 12 will decrease and a latch condition will occur. However, with the use of bi-phase op amp 26, if current is being sunk into terminal 14, comparator circuit 24 will provide an output logic signal, for example a logic low, to the control input of bi-phase op amp 26 which will result in switching the phase of bi-phase op amp 26 and couple the non-inverting input to the first input of bi-phase op amp 26 and the inverting input to the second input of bi-phase op amp 26. Now as the voltage at terminal 14 increases, the voltage at the first input of bi-phase op amp 26 will increase and the voltage at the output of bi-phase op amp 26 will increase, thereby decreasing the drain-source resistance of FET 22. This will result in increasing the voltage at the second input of bi-phase op amp 26 as desired. Thus, bi-phase op amp 26 will not enter a latch condition and the voltage at the control electrode of FET 22 will be regulated. Likewise, it is also understood that if the voltage at terminal 14 is decreasing, current is being sourced from terminal 14 and comparator 24 will sense the direction of current through resistor 20 and provide an output logic signal, for example a logic high, to the control input of bi-phase op amp 26 so that the inverting input is coupled at the first input of bi-phase op amp 26 while the non-inverting input is coupled to the second input of bi-phase op amp 26.

Referring to FIG. 3, a detailed schematic diagram illustrating another enhancement of control loop circuit 10 is shown. It is understood that components similar to those of FIGS. 1 and 2 are designated by the same reference numerals. The circuit of FIG. 3 further comprises resistor 30 coupled between the first input of comparator circuit 24 and the first terminal of control loop circuit 10. Also, capacitor 32 is coupled between the first input of comparator circuit 24 and terminal 34.

The circuit in FIG. 3 provides terminal 34 for inducing an AC signal, typically originating from the central office, to the TIP or RING terminals. Capacitor 32 blocks any DC signal associated with signal $V_{IN}$ and the AC signal appearing at terminal 14 is substantially signal $V_{IN}$ applied to terminal 34 scaled down by the resistor divider network comprised of resistor 30 in series with the combination of resistors 16 and 18 in parallel with resistor 20 and the drain-source resistance of FET 22.

It must be remembered that one goal of the present invention is to provide a circuit that closely matches the impedance of two FETs. This has been accomplished since control loop circuit 10 of FIG. 1 is coupled between both the TIP terminal and the central office and between the RING terminal and the central office. By letting resistors 16,18, and 20 and FET 22 denote the components of control loop circuit 10 coupled between the TIP terminal (14) and the central office and resistors 16',18', and 20' and FET 22' denote the components of control lop circuit 10 coupled between the RING terminal (14') and the central office, and if resistors 16 and 16', resistors 18 and 18', and resistors 20 and 20' are closely matched to each other, then the resistance of FET 22 and FET 22' are closely matched to each other. Therefore, since the control electrode voltage of FETs 22 and 22' are regulated in a control loop, the drain-source resistance of FETs 22 and 22' can be closely matched by matching the resistances of the six resistors (16 and 16', 18 and 18', and 20 and 20') as aforementioned. Further, as noted earlier, these resistors could be incorporated on a single integrated chip which would allow for substantially precise matching as is known. Thus, a circuit has been provided that closely matches the drain-source resistance of FETs without requiring the FETs themselves to be closely matched. This allows FETs to be placed between the TIP/RING terminal and the central office while still maintaining a predetermined resistance that is needed for the rejection of common mode signals as discussed earlier.

One typical requirement for telephone line card circuits is that when the central office desires to conduct various diagnostic testing to an external phone line, which is coupled to the TIP and RING terminals, the impedance looking back into the central office must be substantially large, for example 13 Megaohms. The circuit in FIG. 3 will not provide this requirement unless resistors 16 and 18 had resistances on the order of Megaohms. However, these large value resistances would disrupt the normal operation of bi-phase op amp 26.

Figure 4:
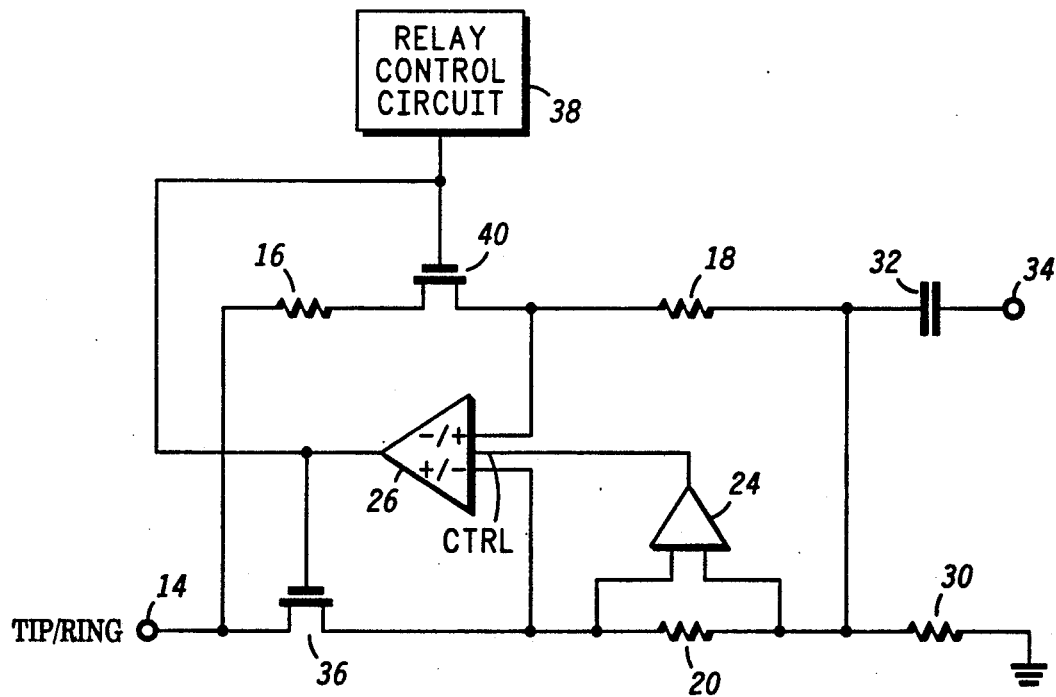
FIG. 4 is a detailed schematic/block diagram illustrating yet another enhancement of the control loop circuit of the present invention.

Referring to FIG. 4, a detailed schematic/block diagram illustrating yet another enhancement of control loop circuit 10 is shown. It is understood that the components similar to those of FIGS. 1, 2, and 3 are designated by the same reference numerals. The circuit of FIG. 4 further comprises FET circuit 36 having a control electrode coupled to the output of bi-phase op amp 26 and to an output of the relay control circuit 38. The first electrode of FET circuit 36 is coupled to the second input of bi-phase op amp 26, while the second electrode of FET circuit 36 is coupled to terminal 14. FET circuit 40 has a control electrode coupled to the control electrode of FET circuit 36, a first electrode coupled to the first input of bi-phase op amp 26, and a second electrode coupled to terminal 14 by resistor 16.

In operation, FETs 36 and 40 are turned off and, thus, go high impedance in response to a first logic state appearing at the output of relay control circuit 38. Further, the impedance exhibited by disabled FETs 36 and 40 is large enough to satisfy the aforementioned requirement for telephone line card circuits. Therefore, when FETs 36 and 40 are disabled, various test signals from the central office can be applied to terminal 14 to perform diagnostic testing on an external phone line without being influenced by the control loop circuit.

One embodiment for FETs 36 and 40 is fully disclosed in a related patent application entitled "Transient Protector Using Common Drain Field Effect Transistors" by Welty et al, having a common assignee and filing date as the subject application. The FET circuit disclosed therein provides both bi-directional operation and protection against the flow of surge currents.

Figure 5:
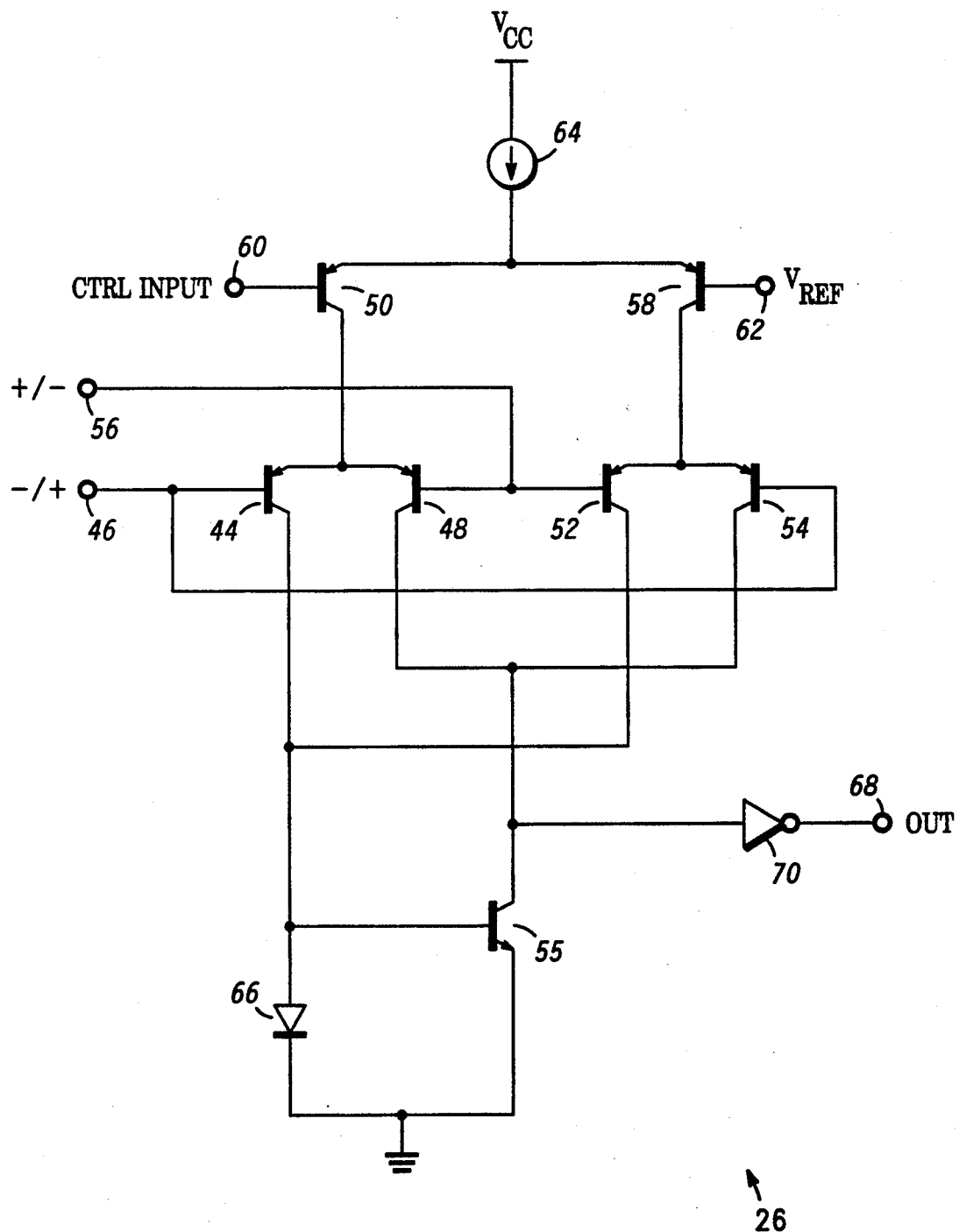
FIG. 5 is a detailed schematic diagram illustrating one embodiment of a bi-phase operational amplifier.

Referring to FIG. 5, a detailed schematic diagram illustrating one embodiment of bi-phase operational amplifier 26 as described above. Bi-phase operation amplifier 26 comprises a first differentially connected pair of transistors which includes transistor 44 having a base coupled to terminal 46 and an emitter coupled to the emitter of transistor 48 and to the collector of transistor 50. The collector of transistor 44 is coupled to the collector of transistor 52 while the collector of transistor 48 is coupled to the collector of transistor 54 and to the collector of transistor 55. The base of transistor 48 is coupled to terminal 56 and to the base of transistor 52. A second differential pair is realized by the emitters of transistors 52 and 54 being coupled to the collector of transistor 58 while the base of transistor 54 is coupled to the base of transistor 44. The base of transistor 50 is coupled to terminal 60 while the base of transistor 58 is coupled to terminal 62. The emitters of transistors 50 and 58 are coupled to operating potential $V_{CC}$ by current source 64, wherein these transistors form a third differential pair. The base of transistor 55 is coupled to the collectors of transistors 44 and 52 and returned to ground by diode 66. The emitter of transistor 55 is also returned to ground. Finally, the collector of transistor 55 is coupled to terminal 68 by inverter 70. It should be realized that diode 66 and transistor 55 form a current mirror having its input coupled to the collectors of transistors 44 and 52 while its output is coupled to the collectors of transistors 48 and 54. Also, it must be noted that terminals 46,56, 60 and 68 respectively represent the first input, the second input, the control input and the output of bi-phase op amp 26. Further, a reference voltage, $V_{REF}$, is applied to terminal 62.

In operation, when the logic signal applied to terminal 60 is in a first logic state, for example a logic high, transistor 58 is rendered operative while transistor 50 is rendered non-operative. Therefore, transistors 52 and 54 are energized while transistors 44 and 48 are not energized. By energizing transistors 52 and 54, bi-phase op amp 26 functions such that terminal 46 (the first input of bi-phase op amp 26) represents the non-inverting input while terminal 56 (the second input of bi-phase op amp 26) represents the inverting input. This can be verified by realizing that if the voltage level at terminal 46 is increasing, then the voltage level at terminal 68 will also be increasing since the increasing voltage level at the base of transistor 54 undergoes two inversions via transistor 54 and inverter 70. Furthermore, if the voltage level at terminal 56 is increasing, then the voltage level at terminal 68 is decreasing since the increasing voltage level at the base of transistor 52 undergoes three inversions via transistor 52, transistor 55 and inverter 70. Therefore, it should be clear that when transistors 52 and 54 are energized, bi-phase op amp 26 operates with the first input (terminal 46) representing the non-inverting input and the second input (terminal 56) representing the inverting input.

On the other hand, when the logic signal applied to terminal 60 is in a second logic state, for example a logic low, transistor 50 is rendered operative while transistor 58 is rendered non-operative. Therefore, transistors 44 and 48 are energized while transistors 52 and 54 are not energized. By energizing transistors 44 and 48, bi-phase op amp 26 functions such that terminal 46 (the first input of bi-phase op amp 26) represents the inverting input while terminal 56 (the second input of bi-phase op amp 26) represents the non-inverting input. Likewise, this can also be verified by realizing that if the voltage level at terminal 46 is increasing, then the voltage level at terminal 68 will be decreasing since the increasing voltage level at the base of transistor 44 undergoes three inversions via transistor 44, transistor 55 and inverter 70. Furthermore, if the voltage level at terminal 56 is increasing, then the voltage level at terminal 68 will also be increasing since the increasing voltage level at the base of transistor 48 undergoes two inversions via transistor 48 and inverter 70. Therefore, it should be clear that when transistors 44 and 48 are energized, bi-phase op amp 26 operates with the first input (terminal 46) representing the inverting input and the second input (terminal 56) representing the non-inverting input.

By now it should be apparent from the foregoing discussion that a novel control loop circuit has been provided that allows for the precision of the resistance of a field-effect transistor to be determined by the precision of other resistors. In addition, a novel telephone line card circuit has also been provided that closely matches the resistance of field-effect transistors while not requiring the field-effect transistors themselves to be closely matched.

I claim:
1. A circuit for providing bidirecitonal current flow between first and second terminals, comprising:
an operational amplifier having first and second inputs and an output;
a field-effect transistor circuit having first, second and control electrodes, said control electrode being coupled to said output of said operational amplifier, said first electrode being coupled to the first terminal, and said second electrode being coupled to said second input of said operational amplifier;
a first resistor coupled between the first terminal and said first input of said operational amplifier;
a second resistor coupled between said first input of said operational amplifier and the second terminal; and
a third resistor coupled between said second input of said operational amplifier and the second terminal, wherein a ratio of the resistance of said field-effect transistor circuit to said third resistor is substantially equal to a ratio of said first resistor to said second resistor.
2. The circuit according to claim 1 further including:
the second terminal being coupled to a first supply voltage terminal; and
a comparator circuit having first and second inputs coupled across said third resistor, and an output coupled to a control input of said operational amplifier, said comparator circuit controlling the switching of non-inverting and inverting inputs of said operational amplifier in response to the direction of current flowing through said third resistor.
3. The circuit according to claim 2 further including:
a capacitor coupled between said first input of said comparator circuit and an input terminal for supplying an AC signal to the circuit; and
a fourth resistor coupled between said first input of said comparator circuit and the second terminal.
4. The circuit according to claim 3 further including:
an additional field-effect transistor circuit having first, second and control electrodes, said control electrode being coupled to said control electrode of said field-effect transistor circuit, said first and second electrodes being coupled between said first input of said operational amplifier and said first resistor; and
a relay control circuit having an output coupled to said control electrodes of said field-effect transistor circuit and said additional field-effect transistor circuit for disabling said field-effect transistor circuit and said additional field-effect transistor circuit.
5. The circuit according to claim 4 wherein said operational amplifier includes:
a first circuit having first and second outputs, and having first and second inputs coupled to said first and second inputs of said operational amplifier;
a second circuit having first and second outputs, and having first and second inputs coupled to said first and second inputs of said operational amplifier;
a control circuit having an input coupled to said control input of said operational amplifier for alternately rendering said first and second circuits operative;
a current mirror having an input responsive to said first outputs of said first and second circuits, and an output coupled to said second outputs of said first and second circuits; and
an inverter coupled between said second outputs of said first and second circuits and said output of said operational amplifier.
6. The circuit according to claim 4 wherein said operational amplifier includes:
a first transistor having a collector, base and an emitter, said base being coupled to said control input of said operational amplifier, and said emitter being coupled to a second supply voltage terminal;
a second transistor having a collector, base and an emitter, said base being coupled to a third supply voltage terminal, and said emitter being coupled to said second supply voltage terminal;
a third transistor having a collector, base and an emitter, said base being coupled to said second input of said operational amplifier, and said emitter being coupled to said collector of said first transistor;
a fourth transistor having a collector, base and an emitter, said base being coupled to said second input of said operational amplifier, and said emitter being coupled to said collector of said first transistor,
a fifth transistor having a collector, base and an emitter, said collector being coupled to said collector of said third transistor, said base being coupled to said second input of said operational amplifier, and said emitter being coupled to said collector of said second transistor, a sixth transistor having a collector, base and an emitter, said collector being coupled to said collector of said fourth transistor, said base being coupled to said first input of said operational amplifier, and said emitter being coupled to said collector of said second transistor, a seventh transistor having a collector, base and an emitter, said collector being coupled to said collectors of said fourth and sixth transistors and to said output of said operational amplifier, said base being coupled to said collectors of said third and fourth transistors and to a fourth supply voltage terminal, and an emitter coupled to said fourth supply voltage terminal;

a current source coupled between said second supply voltage terminal and said emitters of said first and second transistors;

a diode coupled across the base and emitter of said seventh transistor; and an inverter circuit coupled between said collector of said seventh transistor and said output of said operational amplifier.

7. A precision field-effect transistor control loop circuit for providing bidirecitonal current flow between first and second terminals, comprising:

an operational amplifier having first and second inputs and an output;

a field-effect transistor circuit having first, second and control electrodes, said control electrode being coupled to said output of said operational amplifier, said first electrode being coupled to the first terminal, and said second electrode being coupled to said second input of said operational amplifier;

a first resistor coupled between the first terminal and said first input of said operational amplifier;

a second resistor coupled between said first input of said operational amplifier and the second terminal; and a third resistor coupled between said second input of said operational amplifier and the second terminal, wherein a ratio of the resistance of said field-effect transistor circuit to said third resistor is substantially equal to a ratio of said first resistor to said second resistor.

8. The precision field-effect transistor control loop circuit according to claim 7 further including:

a comparator circuit having first and second inputs coupled across said third resistor, and an output coupled to a control input of said operational amplifier, said comparator circuit controlling the switching of non-inverting and inverting inputs of said operational amplifier in response to the direction of current flowing through said third resistor such that said operational amplifier is bi-phase and the precision field-effect transistor control loop circuit is bi-directional.

9. The circuit according to claim 8 wherein said operational amplifier includes:

a first circuit having first and second outputs, and having first and second inputs coupled to said first and second inputs of said operational amplifier;

a second circuit having first and second outputs, and having first and second inputs coupled to said first and second inputs of said operational amplifier;

a control circuit having an input coupled to said control input of said operational amplifier for alternately rendering said first and second circuits operative;

a current mirror having an input responsive to said first outputs of said first and second circuits, and an output coupled to said second outputs of said first and second circuits; and an inverter coupled between said second outputs of said first and second circuits and said output of said operational amplifier.

10. The circuit according to claim 8 wherein said operational amplifier includes:

a first transistor having a collector, base and an emitter, said base being coupled to said control input of said operational amplifier, and said emitter being coupled to a second supply voltage terminal;

a second transistor having a collector, base and an emitter, said base being coupled to a third supply voltage terminal, and said emitter being coupled to said second supply voltage terminal;

a third transistor having a collector, base and an emitter, said base being coupled to said second input of said operational amplifier, and said emitter being coupled to said collector of said first transistor;

a fourth transistor having a collector, base and an emitter, said base being coupled to said second input of said operational amplifier, and said emitter being coupled to said collector of said first transistor, a fifth transistor having a collector, base and an emitter, said collector being coupled to said collector of said third transistor, said base being coupled to said second input of said operational amplifier, and said emitter being coupled to said collector of said second transistor, a sixth transistor having a collector, base and an emitter, said collector being coupled to said collector of said fourth transistor, said base being coupled to said first input of said operational amplifier, and said emitter being coupled to said collector of said second transistor, a seventh transistor having a collector, base and an emitter, said collector being coupled to said collectors of said fourth and sixth transistors and to said output of said operational amplifier, said base being coupled to said collectors of said third and fourth transistors and to a fourth supply voltage terminal, and an emitter coupled to said fourth supply voltage terminal;

a current source coupled between said second supply voltage terminal and said emitters of said first and second transistors;

a diode coupled across the base and emitter of said seventh transistor; and an inverter circuit coupled between said collector of said seventh transistor and said output of said operational amplifier.

11. In a telephone line card, a circuit for providing bidirecitonal current flow between first and second terminals, comprising:

an operational amplifier having first and second inputs and an output;

a field-effect transistor circuit having first, second and control electrodes, said control electrode being coupled to said output of said operational amplifier, said first electrode being coupled to the first terminal, and said second electrode being coupled to said second input of said operational amplifier;

a first resistor coupled between the first terminal and said first input of said operational amplifier;

a second resistor coupled between said first input of said operational amplifier and the second terminal;

a third resistor coupled between said second input of said operational amplifier and the second terminal;

a comparator circuit having first and second inputs coupled across said third resistor, and an output coupled to a control input of said operational amplifier, said comparator circuit controls the switching of the phase of said operational amplifier in response to the direction of current flowing through said third resistor;

a capacitor coupled between said first input of said comparator circuit and a third terminal for supplying an AC signal to the circuit; and a fourth resistor coupled between said first input of said comparator circuit and the second terminal.

12. The circuit according to claim 11 wherein said operational amplifier includes:

a first circuit having first and second outputs, and having first and second inputs coupled to said first and second inputs of said operational amplifier;

a second circuit having first and second outputs, and having first and second inputs coupled to said first and second inputs of said operational amplifier;

a control circuit having an input coupled to said control input of said operational amplifier for alternately rendering said first and second circuits operative;

a current mirror having an input responsive to said first outputs of said first and second circuits, and an output coupled to said second outputs of said first and second circuits; and an inverter coupled between said second outputs of said first and second circuits and said output of said operational amplifier.

13. The circuit according to claim 11 wherein said operational amplifier includes:

a first transistor having a collector, base and an emitter, said base being coupled to said control input of said operational amplifier, and said emitter being coupled to a second supply voltage terminal;

a second transistor having a collector, base and an emitter, said base being coupled to a third supply voltage terminal, and said emitter being coupled to said second supply voltage terminal;

a third transistor having a collector, base and an emitter, said base being coupled to said second input of said operational amplifier, and said emitter being coupled to said collector of said first transistor;

a fourth transistor having a collector, base and an emitter, said base being coupled to said second input of said operational amplifier, and said emitter being coupled to said collector of said first transistor, a fifth transistor having a collector, base and an emitter, said collector being coupled to said collector of said third transistor, said base being coupled to said second input of said operational amplifier, and said emitter being coupled to said collector of said second transistor, a sixth transistor having a collector, base and an emitter, said collector being coupled to said collector of said fourth transistor, said base being coupled to said first input of said operational amplifier, and said emitter being coupled to said collector of said second transistor, a seventh transistor having a collector, base and an emitter, said collector being coupled to said collectors of said fourth and sixth transistors and to said output of said operational amplifier, said base being coupled to said collectors of said third and fifth transistors and to a fourth supply voltage terminal, and an emitter coupled to said fourth supply voltage terminal;

a current source coupled between said second supply voltage terminal and said emitters of said first and second transistors;

a diode coupled across the base and emitter of said seventh transistor; and an inverter circuit coupled between said collector of said seventh transistor and said output of said operational amplifier.

14. The circuit according to claim 13 further including:

an additional field-effect transistor circuit having first, second and control electrodes, said control electrode being coupled to said control electrode of said field-effect transistor circuit, said first and second electrodes being coupled between said first input of said operational amplifier and said first resistor; and a relay control circuit having an output coupled to said control electrodes of said field-effect transistor circuit and said additional field-effect transistor circuit for disabling said field-effect transistor circuit and said additional field-effect transistor circuit.

* * * * *

UNITED STATES PATENT AND TRADEMARK OFFICE
CERTIFICATE OF CORRECTION

PATENT NO. : 5,172,409
DATED : December 15, 1992
INVENTOR(S) : DAVID M. SUSAK

It is certified that error appears in the above-indentified patent and that said Letters Patent is hereby corrected as shown below:

Column 9, line 14, claim 6, delete the word "fourth" and insert the word --fifth --.

line 31, claim 7, delete the word "circuit".
        line 44, claim 7, insert the words --first-second electrode --. after the word "the" and before the word "resistance".
        line 53, claim 8, delete the word "controlling" and insert the word -- controls --.

Column 10, line 23, claim 10, delete the word "second" and insert the word --first --.

Signed and Sealed this

Twenty-sixth Day of April, 1994

Attest:

BRUCE LEHMAN

*Attesting Officer*  *Commissioner of Patents and Trademarks*